United States Patent
Miyachi et al.

(10) Patent No.: US 7,717,157 B2
(45) Date of Patent: May 18, 2010

(54) SUN SHADE APPARATUS

(75) Inventors: Yutaka Miyachi, Kariya (JP); Koichi Takeuchi, Kariya (JP); Shinji Tominaga, Kariya (JP); Yoshitaka Jokaku, Kariya (JP)

(73) Assignee: Toyota Boshoku Kabushiki Kaisha, Aichi (JP)

( * ) Notice: Subject to any disclaimer, the term of this patent is extended or adjusted under 35 U.S.C. 154(b) by 287 days.

(21) Appl. No.: 11/882,937

(22) Filed: Aug. 7, 2007

(65) Prior Publication Data

US 2008/0035283 A1 Feb. 14, 2008

(30) Foreign Application Priority Data

Aug. 10, 2006 (JP) ............... 2006-218099

(51) Int. Cl.
*B60J 1/20* (2006.01)
(52) U.S. Cl. ............... 160/370.22; 160/265; 74/502.6
(58) Field of Classification Search ............ 160/370.22, 160/265; 74/502.4, 502.6; 464/53
See application file for complete search history.

(56) References Cited

U.S. PATENT DOCUMENTS

| | | | | |
|---|---|---|---|---|
| 1,676,534 | A | * | 7/1928 | Dunbaugh, Jr. ............... 464/53 |
| 2,048,398 | A | * | 7/1936 | Lasker ............... 74/502 |
| 6,347,825 | B2 | | 2/2002 | Seel et al. |
| 6,561,057 | B2 | * | 5/2003 | Cebollero ............... 74/502.4 |
| 6,910,518 | B2 | | 6/2005 | Zimmermann et al. |

2007/0023152 A1 2/2007 Starzmann et al.

FOREIGN PATENT DOCUMENTS

| | | |
|---|---|---|
| DE | 10 2005 021 399 | 12/2005 |
| DE | 20 2004 020 106 | 6/2006 |
| DE | 20 2006 017 839 | 3/2007 |
| EP | 1 747 923 | 1/2007 |
| JP | 55-51188 | 4/1980 |
| JP | 59-67612 | 4/1984 |
| JP | 03-17320 | 1/1991 |
| JP | 2005-096529 | 4/2005 |
| JP | 2005-098373 | 4/2005 |
| JP | 2005-319958 | 11/2005 |
| JP | 2006-036190 | 2/2006 |

OTHER PUBLICATIONS

European Search Report mailed Oct. 18, 2007 for European Application No. 07114008.1-2423.

* cited by examiner

*Primary Examiner*—Blair M. Johnson
(74) *Attorney, Agent, or Firm*—Wenderoth, Lind & Ponack, L.L.P.

(57) ABSTRACT

A sun shade apparatus of the present invention has a pair of cables provided so as to be movable in outer tubes. A curtain has its opposite ends connected to ends of each cable and is stretched with the movement of the cables. At least one of the outer tubes is divided into a first tube and a second tube between which a length adjusting mechanism is interposed. The length adjusting mechanism consists of a first connecting member having a female thread formed therein, and a second connecting member having a male thread formed on its outer surface and having a cylindrical portion which is screwed into the female thread of the first connecting member. A fastening nut member which abuts against an end surface of the first connecting member is provided on the cylindrical portion.

3 Claims, 10 Drawing Sheets

SUN SHADE APPARATUS

CROSS REFERENCE TO RELATED APPLICATION

This application claims priority from Japanese Patent Application No. 2006-218099 filed Aug. 10, 2006. The entire content of this priority application is incorporated herein by reference.

TECHNICAL FIELD

The present invention relates to a sun shade apparatus mounted on a vehicle door or the like.

BACKGROUND

A motor-driven type of vehicle door sun shade apparatus drives a motor to perform an operation to force out or draw in a cable. With this operation, a curtain connected to the cable is stretched. A window portion of a vehicle door is shielded by stretching the curtain in this way to prevent an increase in temperature in the vehicle compartment using a sunshade and protect a privacy in the vehicle compartment. See, for example, Japanese Patent Laid-Open Nos. 2005-96529 and 2005-319958.

In the technique disclosed in the above-mentioned publication, both ends of a frame provided on the upper end of a curtain are connected to separate cables to achieve stretching. That is, the cables are respectively provided on front and rear sides of a window portion and a device for simultaneously forcing out drawing in both ends of the frame by means of the cables is provided.

Each cable slides in an outer tube (guide member, cable guide). At the time of assembly of the sun shade apparatus on a vehicle door, however, there is a possibility of occurrence of variation in the slide of each cable due to an error in assembly of the cables provided on the front and rear sides of the window portion. A technique to provide a length adjusting mechanism, for example, on one of the outer tubes to prevent the occurrence of such slide variation is known.

The amount of drawing out of each of the cables provided on the front and rear sides of the window portion can be adjusted by adjusting the length of the outer tube with such length adjusting mechanism. However, if the length adjusting mechanism is easily operable, a variation in length adjustment may be caused by inadvertently touching the adjusting mechanism at the time of assembly on the window portion for example. In such a case, failure to smoothly stretching the curtain and a fault such as a deterioration in external appearance due to slanting of the curtain may occur.

SUMMARY

An object of the present invention is to provide a sun shade apparatus with a length adjusting mechanism in which a smooth curtain stretching operation can be achieved by preventing a malfunction or the like of the length adjusting mechanism, and in which a deterioration in external appearance can also be prevented.

A sun shade apparatus of the present invention is characterized by including: a motor, a pair of outer tubes provided at opposite ends of a window portion, at least one of the outer tubes being divided to have a first tube and a second tube; a pair of cables provided so as to be movable in a forcing-out or drawing-in direction inside the each outer tube respectively by the operation of the motor, a curtain having its opposite ends respectively connected to ends of the cables, the curtain being capable of shielding the window portion by being stretched between a shielding state and an open state on the window portion with the operation for forcing out or drawing in the cables; and a length adjusting mechanism interposed between the first tube and the second tube and provided with a first connecting member provided on an end portion of the first tube and having a female thread formed therein, and a second connecting member provided on an end portion of the second tube and having a male thread formed on its outer surface and having a cylindrical portion which is screwed into the female thread of the first connecting member, and on which a fastening nut member abutting against an end surface of the first connecting member is provided.

According to this arrangement, even when the length adjusting mechanism is inadvertently touched at the time of assembly of the sun shade apparatus on a vehicle door or the like, the fastening nut member abuts against the end surface of the first connecting member and, therefore, the first connecting member and the second connecting member are stopped from rotating, thus avoiding the problem that the adjusted cable length can be changed. Thus, a sun shade apparatus can be provided in which the curtain stretching operation can be smoothly performed and there is a reduced possibility of a deterioration in external appearance such as slanting of the curtain.

In the sun shade apparatus of the present invention, the first connecting member may include a first engaging nut member provided on the end portion of the first tube and engaging a first terminal member having a projecting portion formed on its outer periphery, and a connecting nut member having at its one end a first bolt portion capable of pinching the projecting portion by screwing into the first engaging nut member and has at the other end the female thread screw-engaging with the male thread of the second connecting member.

With this arrangement of the first connecting member, assembly and fixation with the outer tubes are facilitated and the cable length adjustment can be performed easily, thus improving the facility with which the sun shade apparatus is assembled.

Also, the second connecting member may include a second engaging nut member provided on the end portion of the second tube and engaging with a second terminal member having a projecting portion formed on its outer periphery, and a connecting bolt member having at its both ends bolt portions, the second bolt portion screw-engaging with the second engaging nut member to pinch the projecting portion, the third bolt portion having the male thread formed thereon to screw-engage with the female screw of the first connecting member.

With this arrangement of the second connecting member, assembly and fixation with the outer tubes are facilitated and the cable length adjustment can be performed easily, thus improving the facility with which the sun shade apparatus is assembled.

DETAILED DESCRIPTION OF THE PREFERRED ILLUSTRATIVE ASPECTS

A sun shade apparatus of the present invention will be described with respect to an illustrative aspect thereof with reference to the drawings.

Figure 1:
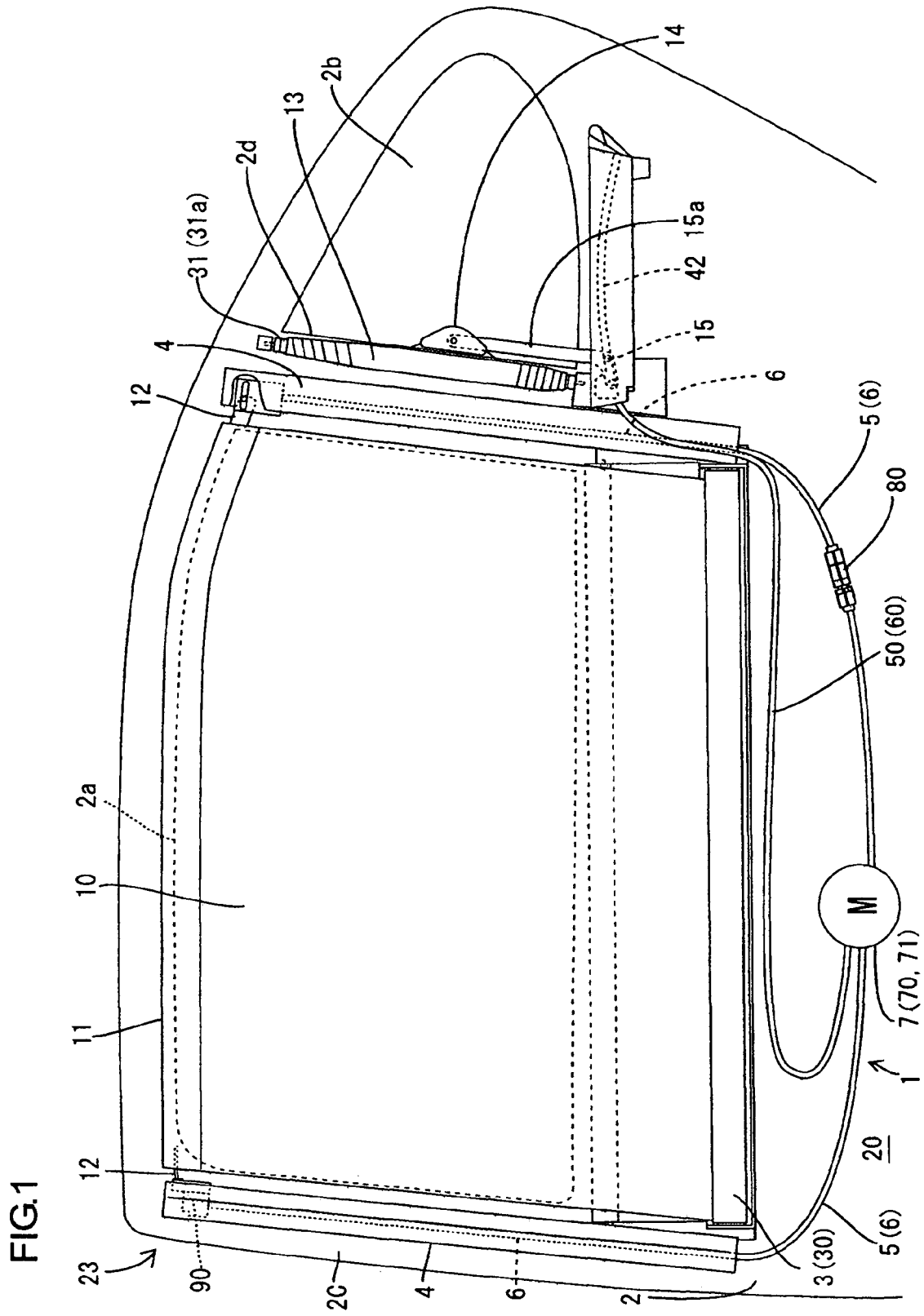
FIG. 1 is a front view of a door of a vehicle from the vehicle interior side.

FIG. 1 is a front view of a vehicle door having a sun shade apparatus in accordance with the present invention seen from the vehicle interior side. As shown in FIG. 1, a vehicle door 23 of the present illustrative aspect has a door panel 2 having side windows 2a and 2b, and a sun shade apparatus (also called a blind apparatus) 1 is provided on the inside of the door panel 2. The door panel 2 has the side windows 2a and 2b in its upper region, the area of which is about half the entire area, and also has a pillar 2c and a pillar (division frame) 2d.

The pillar 2c stands at the vehicle-front-side edge of the door and constitutes a vehicle-front-side window member for the first side window 2a. The pillar 2d stands between the side windows 2a and 2b and partitions these side windows from each other. The pillar 2d constitutes a vehicle-rear-side window member for the first side window 2a and also constitutes a vehicle-front-side window member for the second side window 2b. The pillars 2c and 2d extend substantially parallel to each other to form the first side window 2a on the vehicle front side in substantially rectangular form.

On the other hand, the second side window 2b on the vehicle rear side is formed in substantially triangular form by being partitioned by the pillar 2d. A window glass is mounted in the first side window 2a so as to be upwardly/downwardly movable, while a window glass is immovably mounted in the second side window 2b. A trim 20 is mounted in a lower region of the door panel 2. The trim 20 covers substantially the entire region on the vehicle interior side of the door panel 2 below the side windows 2a and 2b.

The sun shade apparatus 1 has a first blind sheet (curtain) 10 for covering the first side window 2a and a second blind sheet (curtain) 13 for covering the second side window 2b, as shown in FIG. 1. The sun shade apparatus 1 also has a case 3 provided with a roll-up shaft 30 for rolling up the first blind sheet 10, a case 31 having a roll-up shaft 31a for rolling up the second blind sheet 13, and stretching means (6, 7) for stretching the first blind sheet 10 and the second blind sheet 13 between a shielding state and an open state.

The blind sheets 10 and 13 are sheets for shielding light coming into the vehicle compartment (light shielding or attenuating sheets), e.g., mesh sheets or translucent sheets). The blind sheets 10 and 13 are stretched along the vehicle-interior-side surfaces of the window glasses mounted in the side windows 2a and 2b to cover the side windows 2a and 2b.

A frame 11 is attached to an upper end edge of the first blind sheet 10. The frame 11 stretches the upper end edge of the first blind sheet 10 in the vehicle front-rear direction. Sliders 12 extending in the frontward and rearward directions are provided on the front and rear ends of the frame 11.

The sun shade apparatus 1 has a pair of rails 4 for guiding and supporting the sliders 12. Each rail 4 extends along the pillar 2c or the pillar 2d to guide and support the slider 12 in the upward/downward direction. The rails 4 are provided at the same position in the height direction as the first side window 2a.

The stretching means, for stretching the first blind sheet 10 is a means for lifting the sliders 12 along the rails 4. The stretching means has two cables 6, two cable guides (outer tubes) 5 and one pay-out device 7.

Figure 10:
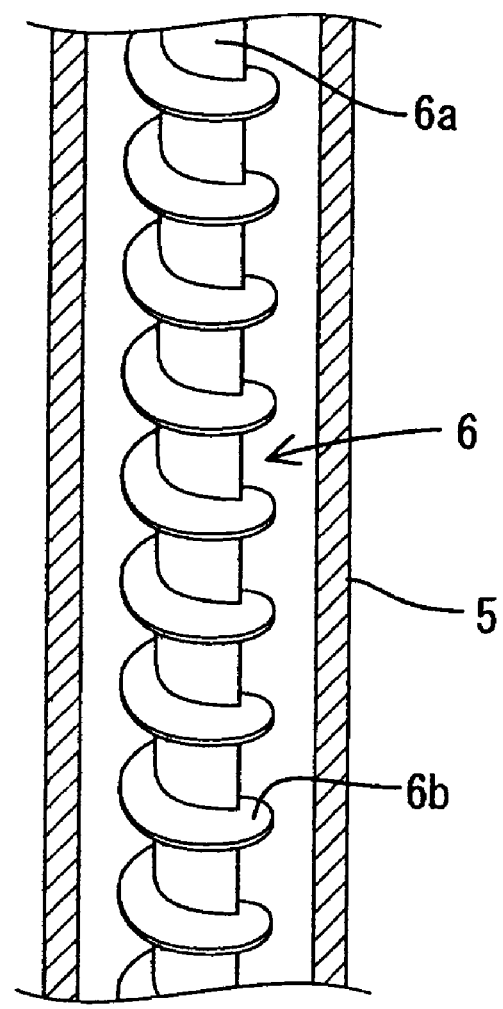
FIG. 10 is a diagram showing the relationship between a cable guide and a cable.

Each cable guide 5 is tubular and a cable 6 is inserted through the cable guide 5. The cable 6 is a compression-resistant member having, for example, as shown in FIG. 10, a core wire 6a formed of a flexible metal wire or a plastic wire or the like, and a coil 6b wound around the outer periphery of the core wire 6a with a constant pitch. One end of the cable 6 is attached by means of a connector 90 to the slider 12 provided on the frame 11 for the first blind sheet 10. The cable 6 is inserted through the rail 4 and subsequently through the cable guide 5. Accordingly, the cable 6 is guided and supported by and moved along the rail 4 and the cable guide 5 to move the slider 12 along the rail 4.

The pay-out device 7 is provided on an intermediate portion of the cable guide 5.

The pay-out device 7 has a gear box 70 having a gear, and a motor 71. The gear is of such a construction (not shown) as to mesh with the coil 6b of the cable 6, and is rotated by the drive force of the motor 71. The cable 6 is paid out by the rotation of the gear. The cable 6 is thereby moved to lift the slider 12 while being guided by the cable guide 5 and the rail 4.

The two cable guides 5 are connected to the pay-out device 7. The two cables 6 inserted through the two cable guides 5 respectively are simultaneously paid out by the one pay-out device 7. Consequently, the two cables 6 lift a pair of sliders 12 in synchronization with each other.

A length adjusting mechanism 80 is provided on at least one of the two cable guides 5 which is the cable guide on the rear side, that is pillar 2d side in the present illustrative aspect.

There is a possibility of occurrence of variation in the slide of each cable 6 due to an error in assembly of the cable 6 at the time of assembly of the sun shade apparatus on the vehicle door 23. The length adjusting mechanism 80 is provided to perform adjustment with respect to this slide variation. That is, the amount of drawing out of each cable 6 can be adjusted by adjusting the length of the cable guide 5 with the length adjusting mechanism 80.

A frame 14 is attached to a stretching end edge of the second blind sheet 13. Also, a slider 15 having an arm 15a downwardly projecting from the frame 14 and swingably supporting the frame 14 is provided on the frame 14.

The sun shade apparatus 1 also has a rail 42 for guiding and supporting the slider 15. The rail 42 is provided below the second side window 2b and extends in the vehicle front-rear direction along the lower end of the second side window 2b. The rail 42 is disposed between the door panel 2 and the trim 20.

The stretching means for stretching the blind sheet 13 is a means for pushing the slider 15 toward the rear of the vehicle along the rail 42. The stretching means for stretching the blind sheet 13 includes a cable 60, a cable guide 50 and the pay-out device 7 for paying out the cable 60. The pay-out device 7 has a gear box 70 and a motor 71. The cable 60 is connected to the slider 15 and is inserted through the rail 42 and the cable guide 50.

On the other hand, the roll-up shaft 30 is provided in the case 3 and is axially supported by the case 3. A lower end edge of the first blind sheet 10 is attached to the roll-up shaft 30. The roll-up shaft 30 is rotated about its axis to roll up the first blind sheet 10. A coil spring (not shown) is provided between the roll-up shaft 30 and the case 3 to urge the roll-up shaft 30. More specifically, the coil spring urges the roll-up shaft 30 in the direction of rolling up the first blind sheet 10. Accordingly, the roll-up shaft 30 rolls up the first blind sheet 10 by the urging force of the coil spring (not shown). The roll-up shaft 31a is axially supported in the other case 31. The roll-up shaft 31a rolls up the second blind sheet 13 by using the urging force of a coil spring (not shown) provided between the roll-up shaft 31a and the case 31.

Next, an essential portion of the sun shade apparatus 1 will be described in detail.

Figure 2:
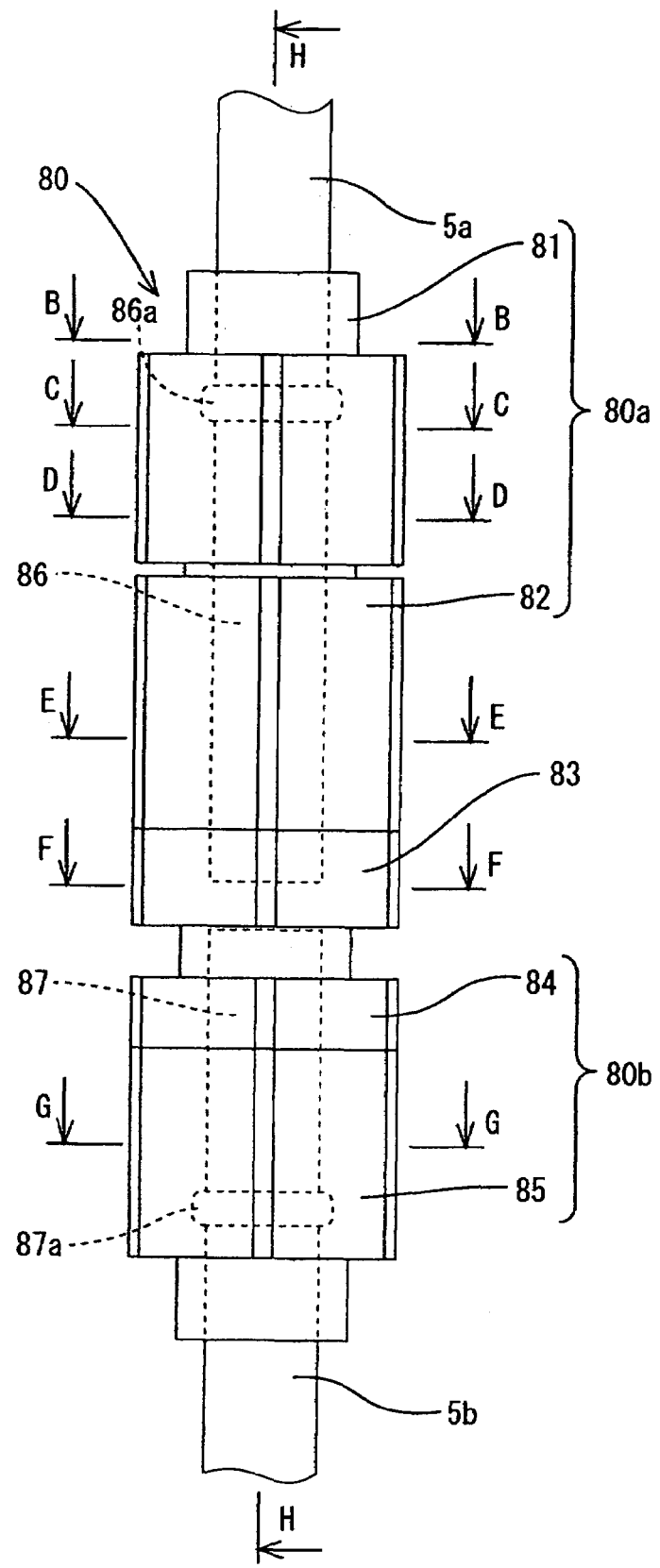
FIG. 2 is a front view showing the construction of a length adjusting mechanism.
Figure 3:
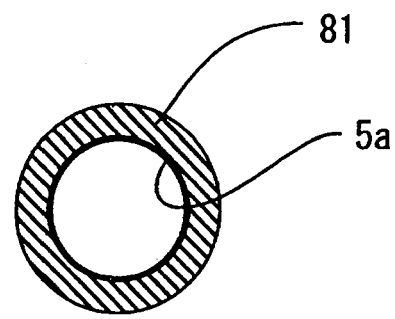
FIG. 3 is a sectional view taken along line B-B in FIG. 2.
Figure 4:
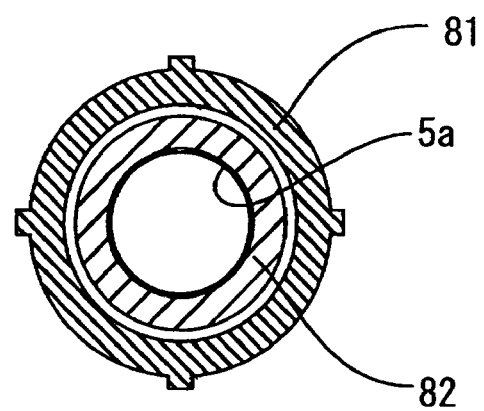
FIG. 4 is a sectional view taken along line C-C in FIG. 2.
Figure 5:
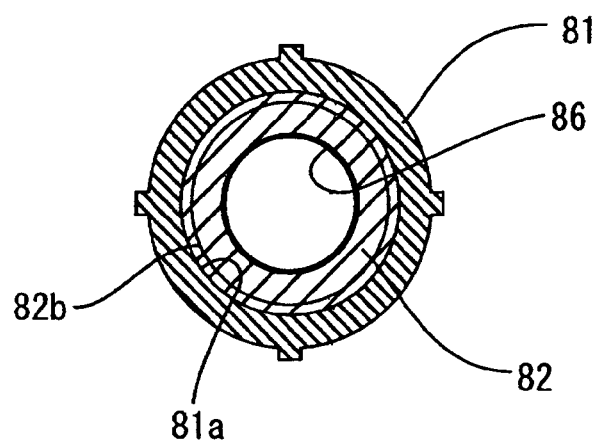
FIG. 5 is a sectional view taken along line D-D in FIG. 2.
Figure 6:
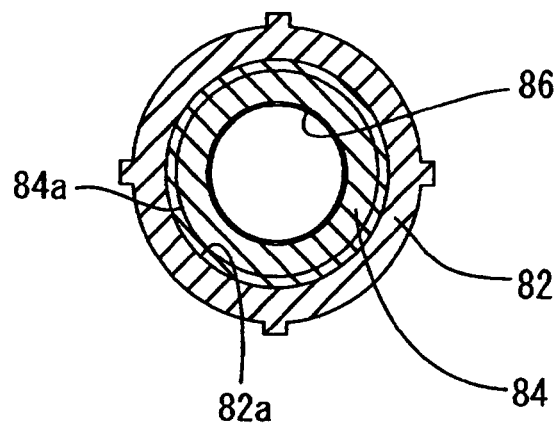
FIG. 6 is a sectional view taken along line E-E in FIG. 2.
Figure 7:
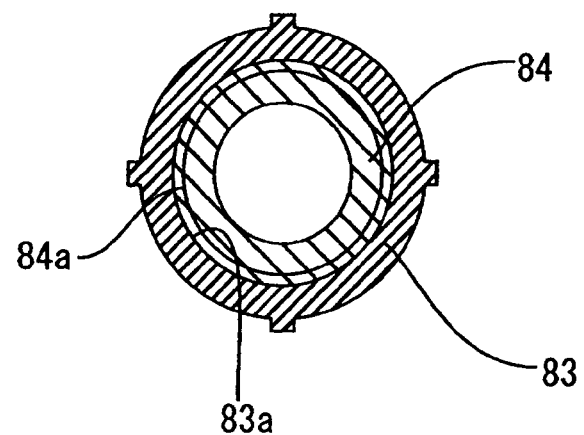
FIG. 7 is a sectional view taken along line F-F in FIG. 2.
Figure 8:
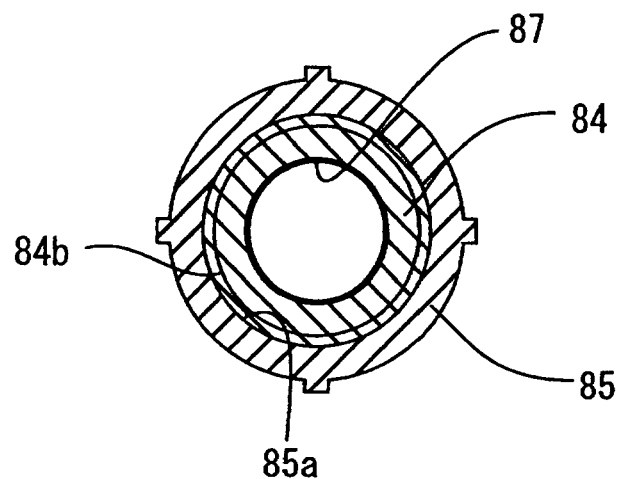
FIG. 8 is a sectional view taken along line G-G in FIG. 2.
Figure 9:
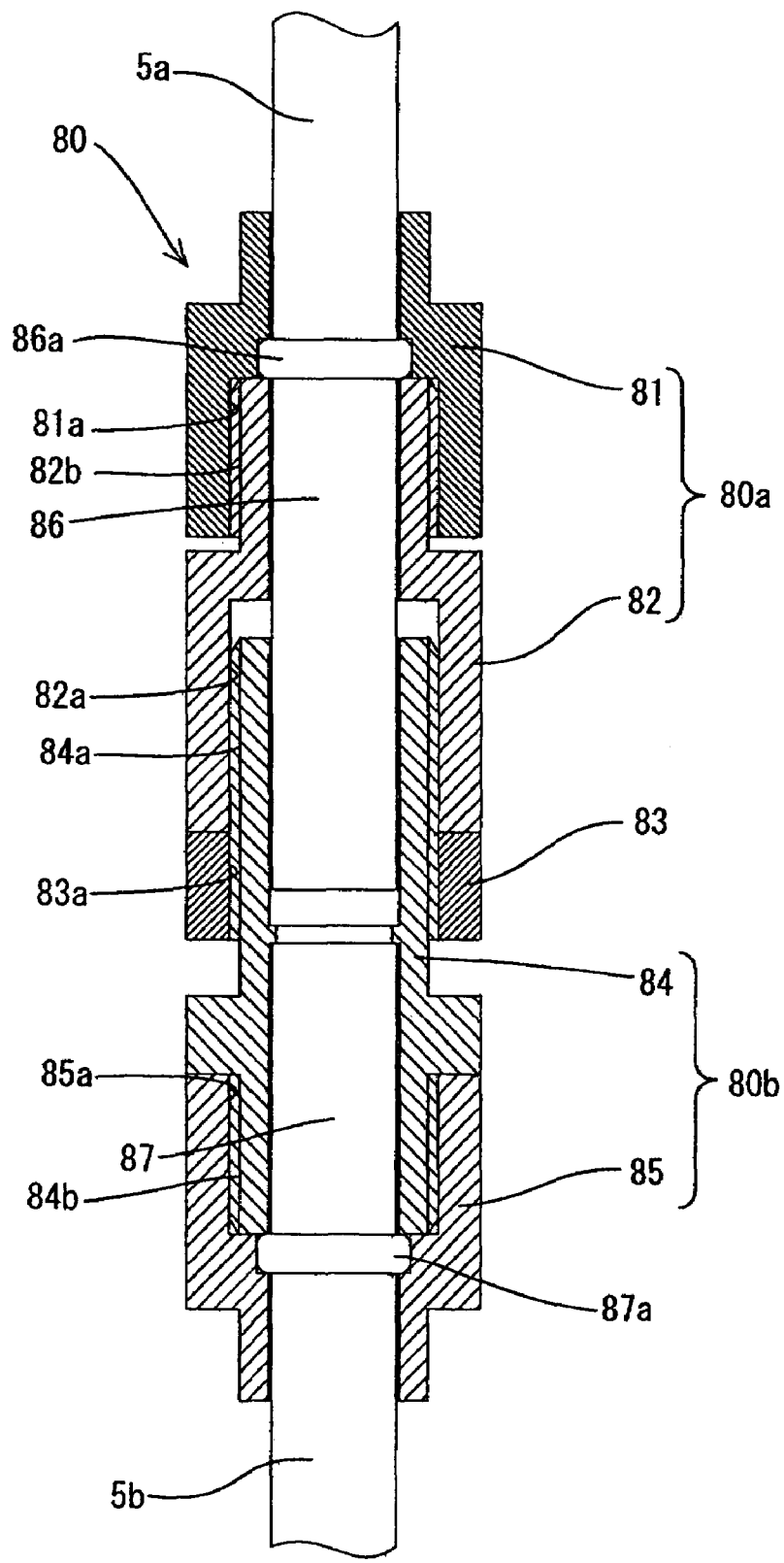
FIG. 9 is a sectional view taken along line H-H in FIG. 2.

FIGS. 2 to 9 are diagrams illustrating the construction of the length adjusting mechanism 80. FIG. 2 is a front view of the length adjusting mechanism 80. FIG. 3 is a sectional view taken along line B-B in FIG. 2. FIG. 4 is a sectional view taken along line C-C in FIG. 2. FIG. 5 is a sectional view taken along line D-D in FIG. 2. FIG. 6 is a sectional view taken along line E-E in FIG. 2. FIG. 7 is a sectional view taken along line F-F in FIG. 2. FIG. 8 is a sectional view taken along line G-G in FIG. 2. FIG. 9 is a sectional view taken along line H-H in FIG. 2.

In the sun shade apparatus 1 of the present illustrative aspect, the length adjusting mechanism 80 is provided on the cable guide 5 on the rear side of the cable guides 5 provided of the font and rear ends of the window portion 2a. As shown in FIG. 2, the cable guide 5 is divided into a first tube 5a and a second tube 5b between which the length adjusting mechanism 80 is interposed. That is, the first tube 5a and the second tube 5b are connected through the length adjusting mechanism 80 to constitute the cable guide 5.

As shown in FIGS. 2 and 9, the length adjusting mechanism 80 is provided with a first connecting member 80a having a female thread 82a and a second connecting member 80b having a male thread 84a which corresponds to the second bolt portion. The first tube 5a and the second tube 5b are moved closer to or away from each other through the screwing relationship which is the movement of the two members close to or away from each other based on screwing between the female thread 82a of the first connecting member 80a and the male thread 84a of the second connecting member 80b. In this way, the length of the cable guide 5 is adjusted (see FIG. 6).

The first connecting member 80a is provided on an end portion of the first tube 5a which is an end portion at the side opposite from the second tube 5b and is constituted by a first engaging nut member 81 and a connecting nut member 82 (see FIGS. 3 to 6).

The first engaging nut member 81 has a female thread 81a.

The connecting nut member 82 has in its one end portion a male thread 82b which corresponds to the first bolt portion screwed into the female thread 81a of the first engaging nut member 81 and has in its opposite other end portion a female thread 82a screwed into the male thread 84a of the second connecting member 80b.

A first terminal member 86 having a ridge portion 86a which corresponds to the projecting portion on its outer periphery is provided on the end portion of the first tube 5a which is the end portion at the side opposite from the second tube 5b.

The first engaging nut member 81 and the connecting nut member 82 are screwed on each other, with the ridge portion 86a of the first terminal member 86 pinched therebetween. These members are assembled on the end of the first tube 5a in this way (see FIG. 5).

On the other hand, the second connecting member 80b is provided on an end portion of the second tube 5b which is an end portion at the side opposite from the first tube 5a and is constituted by a second engaging nut member 85 and a connecting bolt member 84 which is a cylindrical portion (see FIGS. 6, 7, and 8).

The second engaging nut member 85 has a female thread 85a.

The connecting bolt member 84 has in its one end portion a male thread 84b which corresponds to the third bolt portion screwed into the female thread 85a of the second engaging nut member 85 and has in its opposite other end portion a male thread 84a screwed into the female thread 82a of the above-mentioned first connecting member 80a which is specifically, the connecting nut member 82.

A second terminal member 87 having a ridge portion 87a which corresponds to the projecting portion on its outer periphery is provided on the end portion of the second tube 5b which is the end portion at the side opposite from the first tube 5a.

The second engaging nut member 85 and the connecting bolt member 84 are screwed on each other, with the ridge portion 87a of the second terminal member 87 pinched therebetween. These members are assembled on the end of the second tube 5b in this way (see FIG. 9).

The length of the cable guide 5 is adjusted by using the first connecting member 80a and the second connecting member 80b assembled on the ends of the first tube 5a and the second tube 5b according to the above-described arrangement. More specifically, the distance between the both members 80a and 80b is adjusted by adjusting screwing between the female thread 82a formed on the connecting nut member 82 of the first connecting member 80a and the male thread 84a formed on the connecting bolt member 84 of the second connecting member 80b, thus adjusting the length of the cable guide 5.

In the present illustrative aspect, a fastening nut member 83 is interposed between the first connecting member 80a and the second connecting member 80b. The fastening nut member 83 abuts against an end surface of the first connecting member 80a, more specifically an end surface of the connecting nut member 82. The screwing between the connecting nut member 82 of the first connecting member 80a and the connecting bolt member 84 of the second connecting member 80b screwed on each other is maintained by tightening the fastening nut member 83. Therefore, a variation in screwing does not occur easily even by inadvertently touching the adjusting mechanism 80, for example, at the time of assembly of the sun shade apparatus 1 on the window portion 2a of the vehicle door 23. Consequently, the first blind sheet 10 stretching operation can progress smoothly and there is a reduced possibility of occurrence of a fault such as a deterioration in external appearance due to slanting of the first blind sheet 10 for example. When length adjustment is performed, the fastening nut member 83 is unscrewed and the distance between the connecting nut member 82 and the connecting bolt member 84 is adjusted. Thereafter, the fastening nut member 83 is again tightened to fix the connecting members.

In the present illustrative aspect, assembly of the first connecting member 80a on the first tube 5a is achieved by screwing the first engaging nut member 81 and the connecting nut member 82 while interposing the ridge portion or bulge 86a of the first terminal member 86 between the first engaging nut member 81 and the connecting nut member 82. Also, assembly of the second connecting member 80b on the second tube 5b is achieved by engaging the second engaging nut member 85 and the connecting bolt member 84 via the ridge portion or bulge 87a of the second terminal member 87. Therefore, the first connecting member 80a and the second connecting member 80b are firmly assembled on the cable guide 5 and a fault such as detachment of the length adjusting mechanism 80 from the cable guide 5 does not occur easily.

In the present illustrative aspect, the diameter of the cable guide 5 is 8 mm; the amount of insertion of the first terminal member 86 in the first connecting member 80a is 29 mm; and the amount of insertion of the second terminal member 87 in the second connecting member 80b is 38 mm. The amount of insertion is thus increased to prevent detachment of the length adjusting mechanism 80 even in a case where a force is applied, for example, in a direction intersecting the axial direction of the length adjusting mechanism 80 realizing the length adjusting mechanism 80 with a sufficient strength.

The present invention is not limited to the above-described illustrative aspect. Other illustrative aspects described below are also conceivable.

(1) While in the above-described illustrative aspect the length adjusting mechanism 80 is provided on the cable guide 5 on the rear side of the cable guides 5 provided at the front and rear sides of the window portion 2a, the length adjusting mechanism 80 may alternatively be provided on the cable guide 5 on the front side or may be provided on both the cable guides 5 on the front and rear sides.

(2) While the sun shade apparatus 1 is provided on the window portions of the vehicle door 23 in the above-described illustrative aspect, the sun shade apparatus 1 according to the present invention can be applied to house windows as well as to vehicle windows.

What is claimed is:

1. A sun shade apparatus comprising:
a motor;
a pair of outer tubes provided at opposite ends of a window portion, at least one of said outer tubes being divided to have a first tube and a second tube;
a pair of cables provided so as to be movable in a forcing-out or drawing-in direction inside each outer tube respectively by the operation of the motor;
a curtain having its opposite ends respectively connected to ends of said cables, said curtain being capable of shielding the window portion by being stretched between a shielding state and an open state on the window portion with an operation for forcing out or drawing in said cables; and
a length adjusting mechanism interposed between said first tube and said second tube and provided with a first connecting member provided on an end portion of said first tube and having a female thread formed therein, and a second connecting member provided on an end portion of said second tube and having a male thread formed on its outer surface and having a cylindrical portion which is screwed into said female thread of said first connecting member, and on which a fastening nut member abutting against an end surface of said first connecting member is provided, wherein said first connecting member includes:
a first engaging nut member provided on the end portion of said first tube and engaging with a first terminal member having a projecting portion formed on its outer periphery; and
a connecting nut member having at its one end a first bolt portion capable of pinching said projecting portion by screwing into said first engaging nut member and, having at the other end said female thread screw-engaging with the male thread of said second connecting member.

2. A sun shade apparatus comprising:
a motor;
a pair of outer tubes provided at opposite ends of a window portion, at least one of said outer tubes being divided to have a first tube and a second tube;
a pair of cables provided so as to be movable in a forcing-out or drawing-in direction inside each outer tube respectively by the operation of the motor;
a curtain having its opposite ends respectively connected to ends of said cables, said curtain being capable of shielding the window portion by being stretched between a shielding state and an open state on the window portion with an operation for forcing out or drawing in said cables; and
a length adjusting mechanism interposed between said first tube and said second tube and provided with a first connecting member provided on an end portion of said first tube and having a female thread formed therein, and a second connecting member provided on an end portion of said second tube and having a male thread formed on its outer surface and having a cylindrical portion which is screwed into said female thread of said first connecting member, and on which a fastening nut member abutting against an end surface of said first connecting member is provided, wherein said second connecting member includes:
a second engaging nut member provided on the end portion of said second tube and engaging with a second terminal member having a projecting portion formed on its outer periphery; and
a connecting bolt member having bolt portions at both ends of said connecting bolt member, respectively, one of the bolt portions screw-engaging with said second engaging nut member to pinch said projecting portion, and the other bolt portion having said male thread formed thereon to screw-engage with the female thread of said first connecting member.

3. A sun shade apparatus comprising:
a motor;
a pair of outer tubes provided at opposite ends of a window portion, at least one of said outer tubes being divided to have a first tube and a second tube;
a pair of cables provided so as to be movable in a forcing-out or drawing-in direction inside the each outer tube respectively by the operation of the motor;
a curtain having its opposite ends respectively connected to ends of said cables, said curtain being capable of shielding the window portion by being stretched between a shielding state and an open state on the window portion with an operation for forcing out or drawing in said cables; and
a length adjusting mechanism interposed between said first tube and said second tube and provided with a first connecting member which is provided on an end portion of said first tube, which has a female thread formed therein, and which includes a first engaging nut member provided on the end portion of said first tube and engaging with a first terminal member having a projecting portion formed on its outer periphery, and a connecting nut member having at its one end a first bolt portion capable of pinching said projecting portion by screwing into said first engaging nut member and has at the other end said female thread screw-engaging with the male thread of said second connecting member, and a second connecting member which is provided on an end portion of said second tube, which has a male thread formed on its outer surface and has a cylindrical portion which is screwed into said female thread of said first connecting member, and on which a fastening nut member abutting against an end surface of said first connecting member is provided, and which includes a second engaging nut member provided on the end portion of said second tube and engaging with a second terminal member having a projecting portion formed on its outer periphery, and a connecting bolt member having bolt portions at both ends of said connecting bolt member, respectively, one of the bolt portions being a second bolt portion screw-engaging with said second engaging nut member to pinch said projecting portion, and the other of the bolt portions being a third bolt portion having said male thread formed thereon to screw-engage with the female thread of said first connecting member.

* * * * *